UNITED STATES PATENT OFFICE.

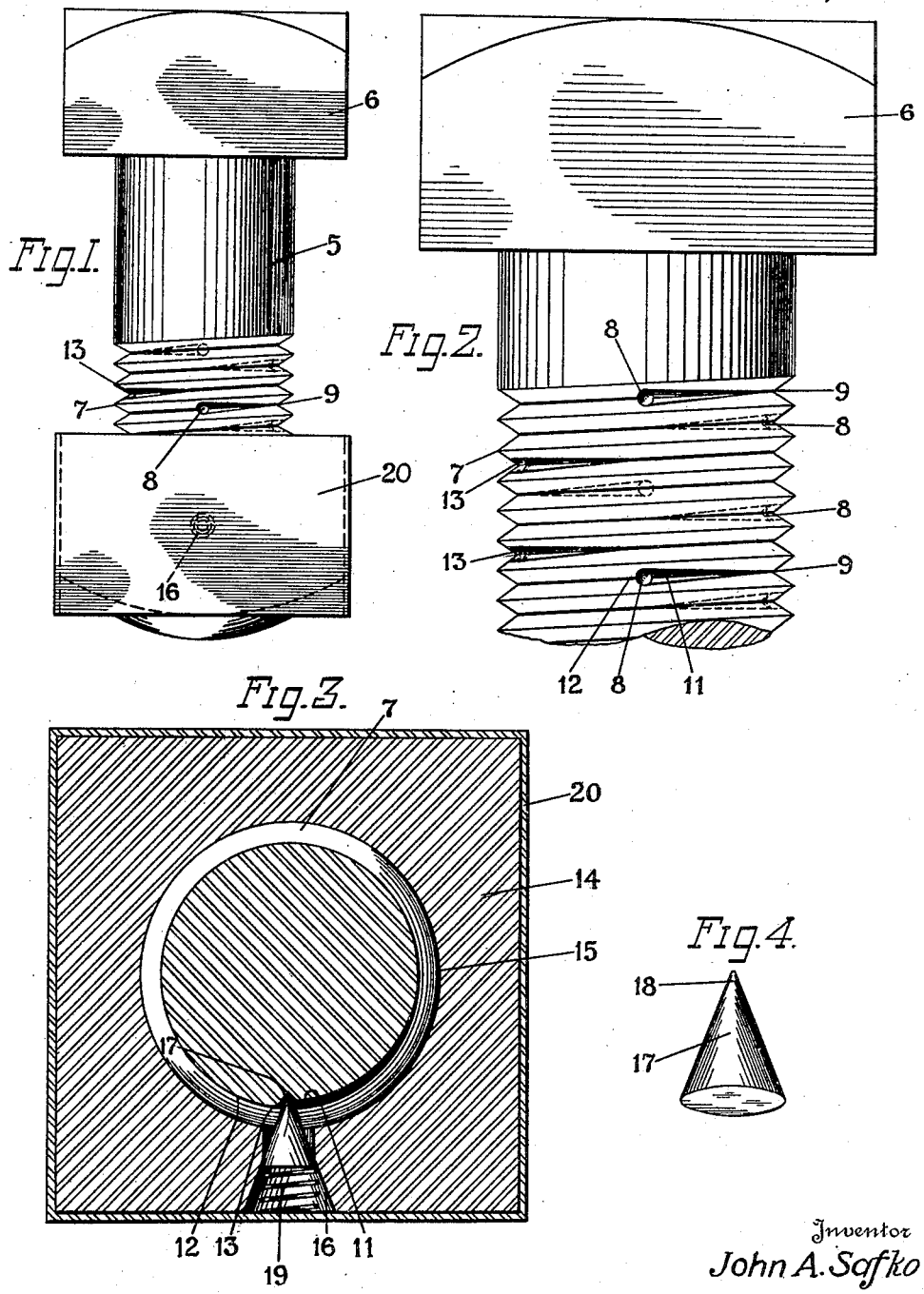

JOHN A. SAFKO, OF MUNSON, PENNSYLVANIA.

NUT-LOCK.

1,398,446.    Specification of Letters Patent.    Patented Nov. 29, 1921.

Application filed June 4, 1921. Serial No. 474,940.

*To all whom it may concern:*

Be it known that I, JOHN A. SAFKO, a citizen of the United States, residing at Munson, in the county of Clearfield and State of Pennsylvania, have invented certain new and useful Improvements in Nut-Locks, of which the following is a specification, reference being had to the accompanying drawings.

This invention relates to nut locks and has for its object to provide a device of this character arranged to lock a nut on a bolt in any position without requiring the manipulation of special fastening means after the nut has reached the desired point.

It is also an object of the invention to provide a device of this character wherein the nut is provided with a spring pressed pawl which is constantly urged into engagement with the bolt, permitting movement of the nut toward the head of the bolt, and preventing movement of the nut away from the head of the bolt.

It is another object of the invention to provide a device of this character wherein the bolt on which the nut is mounted is provided with a series of recesses, said recesses being disposed in the channel formed by the threads of the bolt so as to receive the end of the pawl upon rotation of the nut.

It is also an object of the invention to provide a device of this character wherein the recesses interposed in the channel formed by the threads of the bolt are so constructed that one side wall of the recess is higher than the other so as to form a tooth to be engaged by the pawl.

It is a further object of the invention to provide a device of this character wherein the channel formed by the threads of the bolt is deeper on one side of the recess than on the other, so as to guide the pawl into engagement with the tooth.

It is still a further object of the invention to provide a device of this character wherein the nut is provided with an opening in which a spring pressed pawl is mounted, the opening being arranged to limit movement of the pawl toward the bolt.

With these and other objects in view the invention consists in the improved construction and arrangement of parts to be hereinafter more particularly described, fully claimed and illustrated in the accompanying drawings in which:—

Figure 1 is a view in elevation of a nut lock constructed in accordance with an embodiment of the invention, Fig. 2 is an enlarged fragmentary view of the bolt, Fig. 3 is a transverse sectional view through the nut and bolt, and Fig. 4 is a perspective view of the pawl.

Referring to the drawings, 5 designates a conventional form of bolt including a head 6, said bolt being provided with conventional form of threads 7. In order to permit a nut to be locked on the bolt without interfering with the threads of the bolt, there is provided a series of recesses 8 which are helically disposed longitudinally of the bolt. These recesses are preferably conical in cross section and are disposed within the channel 9 formed between the threads 7 of the bolt. In order to prevent accidental movement of the locking means of the nut, the portion 11 of the channel 9, or in other words, the portion on the right hand side of each recess, is deeper and wider than the portion 12 of the channel on the left hand side of the recess so as to substantially form a step in the channel 9 without interrupting the train of the threads 7. The wall 13 of the recess forming the end of the portion 12 of the channel substantially provides a tooth which is interposed in the path of movement of the locking means of the nut to prevent rotation of the nut to the left, the bottom of the recess 8 being disposed slightly below the portion 11 of the channel. With this arrangement, the recesses and the portions 11 and 12 of the channel 9 substantially coöperate to form ratchet teeth helically of the bolt.

The nut 14 of the bolt is conventional in form and includes the usual threaded inner wall 15 for engagement with the threads 7 of the bolt. An opening 16 is provided in one side of the nut, said opening being substantially conical from the outer face of the nut to the intermediate portion of the opening, the remainder of the opening, that is from the intermediate portion to the inner wall of the nut, being the same diameter to prevent passage of the base of the locking means or pawl entirely through the opening, thereby limiting engagement of the locking means with the bolt. The locking means of the nut embodies a pawl 17 which is substantially conical, the pawl being slightly smaller than the opening 16 so as to permit projection of the apex 18 of the pawl through the inner end of the opening 16. The conical pawl is adapted to conform to the shape and size of the channel 9 so as not to interfere with the engagement of the threads 7 with the threads of the wall 15, and also to permit said pawl to be directed into the recesses 8.

The pawl 17 is adapted to be mounted in the opening 16, and is constantly urged through the inner wall 15 by means of a spring 19 which engages the outer end of the pawl, movement of the pawl through the apex portion of the opening 16 being limited by engagement of the central portion of the opening 16 with the base portion of the pawl. In order to permit the pawl and spring to be removed when it is desired to unlock the bolt, and to prevent accidental disengagement of the pawl and spring from the nut, there is provided novel retaining means in the form of a band 20, which is adapted to surround the outer faces of the ends and is secured to the nut in any suitable manner, a portion of the band being adapted to engage the outer end of the spring 19 so as to permit said spring to urge the pawl inwardly of the nut.

By the novel step formation of the channel, or ratchet teeth formed by the end walls 13 of the recesses 8, the pawl, when the nut is rotated to the right, will move through the channel 9, over the portion 12 of the channel, and into the adjacent recess 8. Continued movement of the nut to the right will disengage the pawl from the recess 8 and cause the same to ride over the portion 11 of the channel. This operation is repeated until the nut reaches the desired point on the bolt, whereupon the pawl is engaged with one of the adjacent recesses and locks the nut without any further operation on the part of the operator. Should any force attempt to rotate the nut to the left, the pawl 17 will be urged into engagement with the stop or tooth formed by the side portion 13 of the recess, thereby obstructing further movement of the nut so that accidental rotation of the nut to the left on a right hand threaded bolt is impossible. Should it be necessary to remove the nut from the bolt, this may be accomplished by removing the band 20 from the nut, and the pawl 17 and spring 19 from the opening 16. The obstruction of the rotation of the bolt is thereby removed and the nut may be rotated to the left and disengaged from the bolt by the operator.

From the foregoing it will be readily seen that this invention provides a novel form of nut lock which locks the nut firmly in position on the bolt without causing grooves or slots to interrupt the train of the threads, or engaging the threads of the bolt in any manner. The construction of the locking means is such that it does not require a special form of bolt or nut but may be incorporated in the conventional form of bolt or nut now in use, and may be used with entire satisfaction on all bolts regardless of size.

What is claimed is:—

1. A nut lock of the character described comprising a bolt having an uninterrupted train of threads, a channel provided between the threads of the bolt, having a series of helically spaced recesses, a portion of said channel on one side of the recess being lower than the portion of the channel on the opposite side of the recess, a nut arranged for engagement with the bolt, said nut having a conical opening extending through one face thereof, a conical pawl movable in said opening and arranged to project beyond the inner wall of the nut, a spring urging said pawl toward the bolt and retaining means carried by the nut and adapted to extend over the outer end of the opening to prevent disengagement of the spring and pawl from said opening.

2. A nut lock of the character described comprising a bolt having spaced depressions disposed between the threads of the bolt, said bolt having a guide channel extending from each depression and in the direction of the threads, the end of the channel adjacent the depression corresponding in width to the diameter of the depression, said channels being inclined inwardly toward the depressions and gradually decreasing in width and depth from the ends of the channels to the opposite ends of said guides, a nut on the bolt, and means carried by the nut and arranged to be guided into one of the depressions.

In testimony whereof I hereunto affix my signature.

JNO. A. SAFKO.